United States Patent

Morrow et al.

[15] 3,707,671

[45] Dec. 26, 1972

[54] INDUCTIVE VIBRATION PICKUP APPARATUS

[72] Inventors: Robert S. Morrow, 4148 Rowanne Court, Columbus, Ohio 43214; Lloyd D. Penn, 190 Crestview Drive, Johnstown, Ohio 43031; Kenneth E. Hays, 397 N. Stygler Road, Gahanna, Ohio 43220

[22] Filed: May 1, 1970

[21] Appl. No.: 33,673

Related U.S. Application Data

[63] Continuation of Ser. No. 697,109, Jan. 11, 1968, abandoned.

[52] U.S. Cl. ....................................324/34 R, 336/179

[51] Int. Cl. ....................................G01r 33/00

[58] Field of Search ......324/34, 40, 41; 331/65, 109; 336/179

[56] References Cited

UNITED STATES PATENTS

| | | | |
|---|---|---|---|
| 3,539,912 | 11/1970 | Wardle | 324/34 |
| 3,353,098 | 11/1967 | Foster et al. | 324/83 FC |
| 3,287,680 | 11/1966 | Houpt et al. | 336/179 |
| 3,102,217 | 8/1963 | Bullen | 331/109 |
| 2,883,538 | 4/1959 | Elam | 324/34 O |
| 3,473,110 | 10/1969 | Hardin et al. | 324/34 R |

*Primary Examiner*—Alfred E. Smith
*Attorney*—T. H. Murray

[57] ABSTRACT

Electrical sensing apparatus such as proximity switches and vibration pickups of the type in which the distance between an inductor in the tank circuit of an oscillator and a metallic object in the field of the inductor is indicated by the amplitude at the output of the oscillator. The apparatus incorporates means adapted to compensate the output and/or sensitivity of the oscillator for temperature variations in either the inductor or the oscillator circuitry. Temperature compensation is achieved by means of thermistors, one of which is in series with the inductor and the other of which is in the oscillator network.

8 Claims, 4 Drawing Figures

INVENTORS.
ROBERT S. MORROW
LLOYD D. PENN &
KENNETH E. HAYS
By Murray & Linklauer
Attorneys INVENTORS.
ROBERT S. MORROW
LLOYD D. PENN &
KENNETH E. HAYS
By Murray & Linkham
Attorneys

INDUCTIVE VIBRATION PICKUP APPARATUS

CROSS-REFERENCES TO RELATED APPLICATIONS

This application is a continuation of copending application, Ser. No. 697,109, filed Jan. 11, 1968, now abandoned.

BACKGROUND OF THE INVENTION

In the past, electrical sensing devices have been provided comprising an electrical oscillator having a tank circuit including an inductive element, characterized in that the amplitude of the oscillations produced by the oscillator are a function of the displacement between the tank circuit inductive element and a metallic object in the field of the inductive element. Such devices operate on the eddy current principle, the output of the oscillator being a function of the radiated energy absorbed by the metallic object in the field of the inductance. As will be understood, this absorbed energy is, in turn, a function of the distance between the inductance and the metallic object. Consequently, such devices can be used as proximity detectors or as pickups for vibration analyzing apparatus.

In the case of a proximity detector, a change in the output of the oscillator occurs when a metallic object comes within the field of the tank circuit inductance, which usually is incorporated in a compact sensing head or probe. The output change normally activates a suitable relay.

The use of such a device as a vibration pickup operates on somewhat the same principle, except that the output of the oscillator is utilized to produce a sinusoidal wave shape signal resulting from the oscillatory vibrational movement of a metallic member relative to a stationary inductive pickup. Consider, for instance, any rotating shaft housed within a bearing. Due to unbalance or eccentricity, the shaft will oscillate in a plane normal to its axis of rotation. Consequently, by mounting an inductive proximity pickup in a bearing for the shaft such that the periphery of the shaft is in the inductive field for the pickup, the output of the oscillator to which the pickup is connected can be rectified and used to generate a sinusoidal vibrational signal for vibration analyzing purposes. The principal use of such proximity devices is to measure the instantaneous vibration characteristics of rotating bodies such as motor, engine and dynamo components.

SUMMARY OF THE INVENTION

Apparatus of the type described above is temperature sensitive due to changes in the resistivity of the inductive pickup as the surrounding temperature varies. That is, the inductive element is a small coil of fine copper wire which has a positive temperature coefficient of resistance. In this respect, its resistance at 350°F is about 67 percent higher than at 75°F. The quality factor, Q, of the coil is inversely proportional to resistance and, therefore, decreases at elevated temperatures. This, in turn, decreases the sensitivity of the inductive element, causing the vibrational reading and static gap reading to be in error. Such devices are employed in a variety of high temperature environments as well as at ambient room temperature.

Furthermore, the output of the radio frequency oscillator to which the inductive pickup is connected will vary in amplitude as the surrounding temperature changes. This is true particularly in the case of inductive pickups surrounded by a metallic shield. The shield is usually in the form of an open-ended tube which permits the lines of flux to penetrate a bearing or shaft, for example, while isolating it from other surrounding metal bodies. This shield also acts as a heat sink; and since it is in the field produced by the coil, it acts as an autotransformer shorted turn which affects the magnetic lines of flux produced by the coil. As the temperature of the shield changes, so also does its effect on the lines of flux, resulting in an output variation in amplitude from the oscillator as the surrounding temperature varies, particularly that of the shield. Ordinary temperature stabilization of the oscillator and detector circuitry is impractical for the reason that the massive feedback networks utilized in conventional temperature stabilization devices will not facilitate a high quality factor representing circuit efficiency and sensitivity.

Accordingly, the objects of the invention include:

To provide temperature compensating means in an inductive electrical sensing device of the type described whereby the output of the oscillator to which an inductive pickup is connected is essentially unaffected over wide temperature ranges without requiring any manual adjustment of the oscillator or its associated circuitry;

To provide temperature compensating means of the type described which maintains a high quality factor of the oscillator to which the inductive pickup of the proximity device is connected;

To provide temperature compensating means for an inductive electrical sensing device wherein a negative temperature coefficient thermistor is connected in series with the inductive pickup which has a positive temperature coefficient of resistance to present a total resistance to the oscillator which is temperature invariant; and To provide temperature stabilization for an oscillator utilized in connection with an inductive-type proximity pickup, temperature stabilization being achieved by means of a thermistor in the oscillator base bias network.

In accordance with the invention, a thermistor having a negative temperature coefficient of resistance is connected in series with the inductive element in the tank circuit of an oscillator utilized in a vibration pickup or other similar electrical sensing device. In this manner, an increase in the resistance of the pickup coil at higher temperatures, particularly higher temperatures of the surrounding shield, is compensated for by a decrease in the resistance of the thermistor, thereby maintaining substantially constant the quality factor of the coil as presented to the oscillator. The resistance of the thermistor normally varies exponentially with temperature; however this can be made linear by placing a fixed resistance across it.

Further, in accordance with the invention, temperature compensation of the oscillator itself is provided by means of a thermistor connected to one of the electrodes of a transistor forming the electron valve in the oscillator itself. Preferably, the thermistor is connected in series with other components in the oscillator base bias network such that as the characteristics of the transistor change due to temperature changes, they are compensated for by the thermistor.

DESCRIPTION OF THE PREFERRED EMBODIMENT(S)

Figure 1:
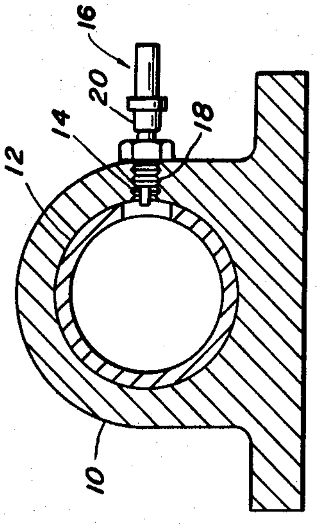
FIG. 1 is a cross-sectional view showing the manner in which the inductive probe or pickup of the invention may be mounted in relation to one type of rotating body.

With reference now to the drawings, and particularly to FIG. 1, a bearing housing 10 is shown provided with an interior bushing 12. The side wall of the housing 10 is provided with a threaded opening 14 which receives a proximity pickup 16 having external threads 18.

Figure 2:
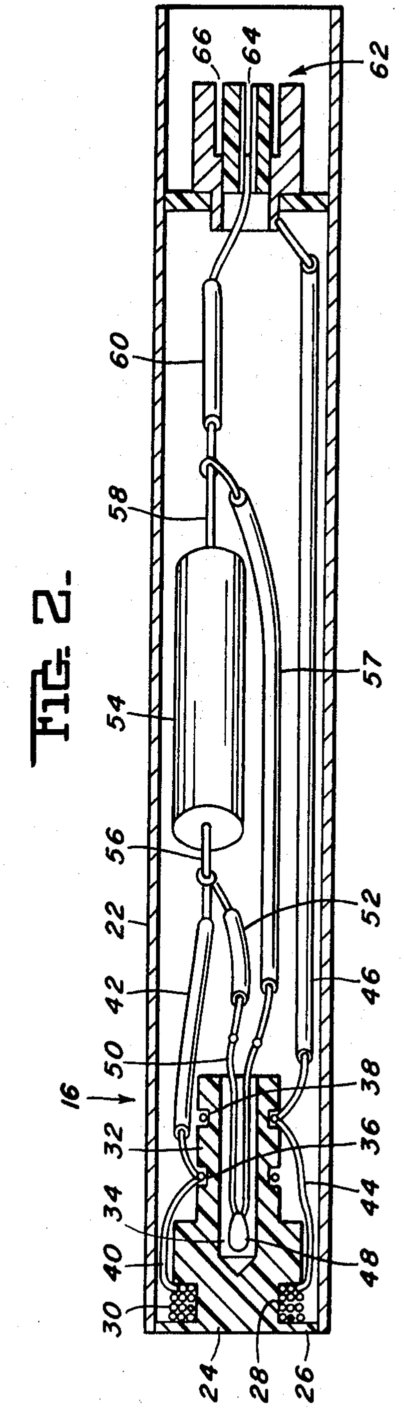
FIG. 2 is a cross-sectional view of the probe shown in FIG. 1.

The details of the proximity pickup 16 are illustrated in FIG. 2. It comprises a hollow tubular member 22 which, as shown in the drawings, is metal. A bobbin 24 is provided at the forward, open end of the tubular member 22. The bobbin 24 is formed from nylon or other similar plastic insulating material. The bobbin 24 has a cylindrical portion 26 which fits snugly within the tubing 22. A groove 28 in the bobbin 24 receives a coil 30 of wire which constitutes the actual inductive element which, as will be explained, constitutes the inductive element in the tank circuit of an oscillator. The bobbin 24 has a rear sleeve portion 32 having a bore 34 and having peripheral grooves 36, 38. A first wire end 40 of the coil 30 is wound in the groove 36 and is soldered to a larger diameter lead 42 which is also wound into the groove 36. In a similar manner, the other wire end 44 of the coil 30 is wound in the groove 38 and soldered to a larger diameter lead 46 which is also wound into the groove 38.

Inserted into the bore 34 is a negative temperature coefficient thermistor 48 having a first lead 50 connected to lead 52 and a second lead 54 spliced to lead 56. The resistance of the thermistor 48, having a negative temperature coefficient of resistance, will decrease as its temperature increases and will increase as its temperature decreases.

An electrical resistor 54 is provided with leads 56, 58. The lead 56 is soldered to the conductors 42 and 52. The lead 58 is soldered to the conductor 57 and a conductor 60.

As will be explained more in detail hereinafter, the thermistor 48 is connected in parallel with the resistor 54. The parallel combination of thermistor 48 and resistor 54 is in series with the coil 30. A coaxial cable connector 62 is fitted into the rear end of the tube 22. One connector terminal 64 is electrically connected to the conductor 60, while the other connector terminal 66 is electrically connected to the conductor 46. The entire space within the tubular member 22 is filled with a potting material such as an epoxy resin.

Figure 3:
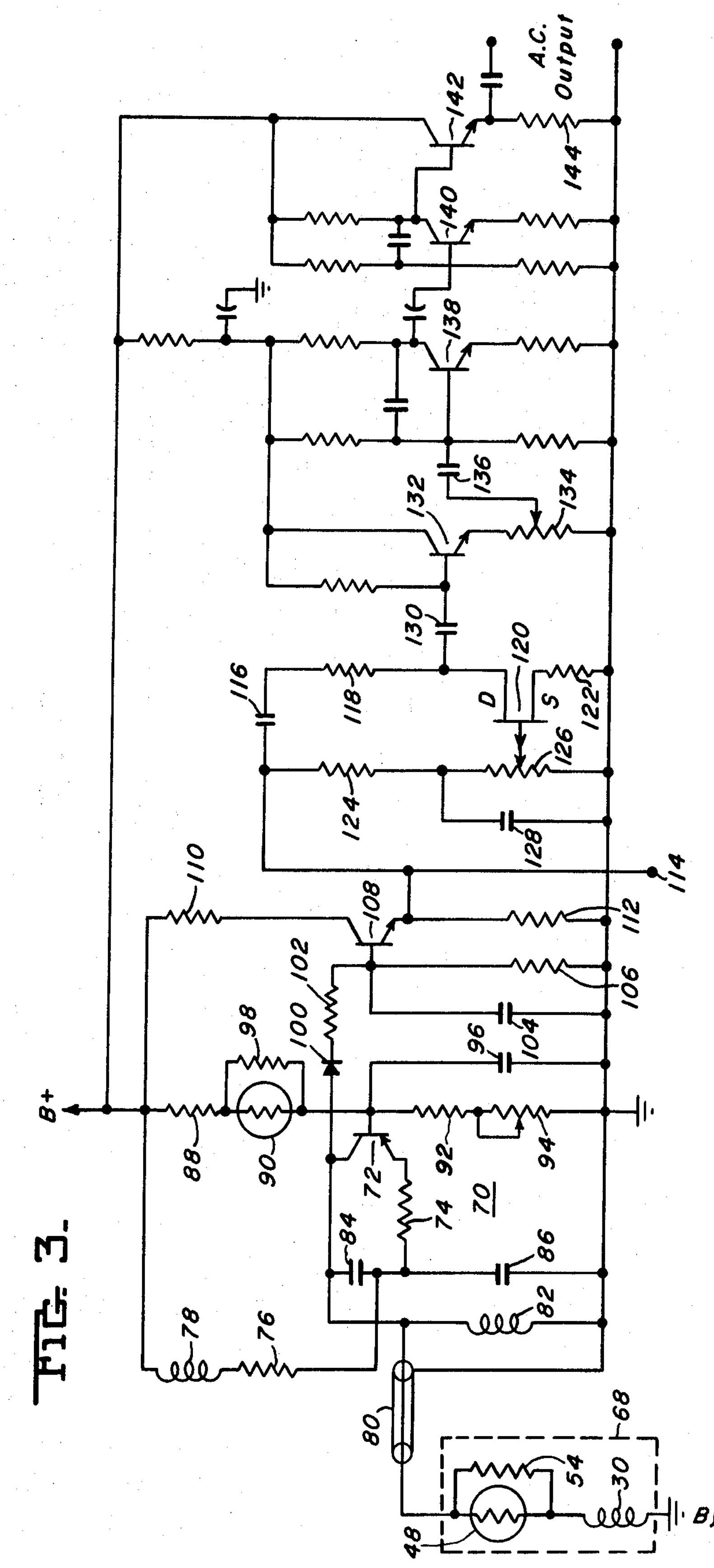
FIG. 3 is a schematic circuit illustration of one embodiment of the invention employing thermistors for temperature compensation.

The pickup unit just described is identified in FIG. 3 by the broken line 68. The illustrated electrical elements are the thermistor 48, the resistor 54 and the coil 30. The oscillator itself is of the Colpitts type and is identified generally by the reference numeral 70. It is provided with a PNP transistor 72 having its emitter connected through resistors 74 and 76 and a radio frequency choke coil 78 to a source of driving potential, identified as B+.

The tank circuit of the oscillator 70 includes the coil 30, the thermistor 48 and resistor 54. One end of the coil 30 is connected to ground through the shield of a coaxial cable 80, while the upper end of the parallel combination of thermistor 48 and resistor 54 is connected through the center conductor of the coaxial cable 80 to the collector of transistor 72. With the arrangement shown, the pickup assembly enclosed by broken lines is in parallel with a second inductor coil 82 which is connected between the collector of transistor 72 and ground.

In shunt with the inductor 82 are series-connected capacitors 84 and 86, the junction of these capacitors also forming the junction between resistors 74 and 76. Base drive for the transistor 72 is provided by means of a voltage divider network including resistor 88, a second thermistor 90, a resistor 92 and a rheostat 94. A capacitor 96 is in parallel with resistance elements 92 and 94. A resistor 98 is in shunt with the thermistor 90. The inductor 82 and the pickup coil 30 both form a part of the tank circuit for oscillator 70. The inductance of inductor 82 is much larger than that of coil 30.

With the arrangement shown, the oscillator 70 will produce output oscillations on the collector of transistor 72 at a frequency of about 1 megacycle. These oscillations are rectified by a rectifier 100 and applied through resistor 102 across a smoothing capacitor 104. The resulting rectified signal is, in turn, applied across resistor 106 and, hence, appears at the base of a direct current emitter follower transistor 108. The collector of transistor 108 is connected to the B+ voltage source through resistor 110; while its emitter is connected to ground through resistor 112.

If it is assumed, for example, that a metallic object is located at a fixed distance from the pickup coil 30 and in the field of the coil, the oscillator 70 will produce output oscillations which are rectified by rectifier 100 and applied to the base of transistor 108. Under these circumstances, a direct current voltage, proportional in magnitude to the distance between the pickup coil and the object in its field, will appear at the emitter of transistor 108 and a gap output terminal 114. There are no alternating components in the rectified direct current voltage.

Now, if it is assumed that an object, such as a shaft within the bearing 12 of FIG. 1, is vibrating back and forth with respect to the pickup coil 30, oscillations will still be produced at a frequency of about 1 megacycle by the oscillator 70. However, the oscillations will cyclically vary in amplitude as the periphery of the shaft moves toward and away from the pickup coil 30. The frequency of this cyclic variation will correspond to the vibrational frequency of the shaft within bearing 12. Under these circumstances, the output of the oscillator at the collector of transistor 72 will appear as waveform A in FIG. 4 wherein the oscillator output signal periodically varies in amplitude.

Figure 4:
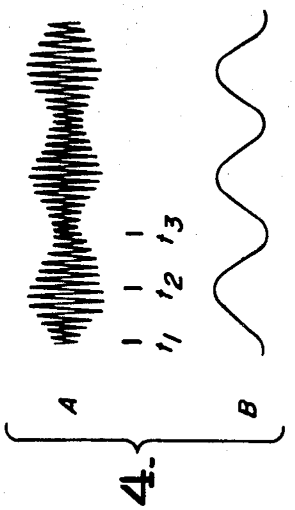
FIG. 4 comprises waveforms illustrating the operation of the circuit of FIG. 3.

Between times $t_1$ and $t_2$ in waveform A of FIG. 4, the periphery of the shaft within bearing 12 is moving away from the pickup 30 such that less radiated energy is absorbed as eddy current and hysteresis losses. As a result, the amplitude of the output oscillations increases. Between times $t_2$ and $t_3$ of FIG. 4, however, the periphery of the shaft within bearing 12 is moving toward the pickup; whereupon the loss of radiated energy increases and the amplitude of the oscillations decreases.

The oscillations, after rectification in rectifier 100 and smoothing by capacitor 104, will appear as a sinusoidal varying direct current voltage illustrated as waveform B in FIG. 4. This voltage, when applied to the base of transistor 108, will still produce a direct current voltage at the output terminal 114. This same alternating current component will be applied through a coupling capacitor 116 and a resistor 118 to the drain lead of a field effect transistor 120. The source lead of the field effect transistor 120, in turn, is connected to ground through a resistor 122.

The alternating component comprising waveform B of FIG. 4 is also applied through resistor 124 across a potentiometer 126 having a capacitor 128 in shunt therewith. The capacitor 128 filters the alternating current signal so that only an average direct current signal is applied to the potentiometer 126. The movable tap on the potentiometer 126, in turn, is connected to the gate of the field effect transistor 120. By virtue of the capacitor 128, the voltage appearing across the potentiometer 126 is a steady-state voltage comprising the average voltage of the alternating component direct current waveform illustrated in waveform B in FIG. 4. This average voltage will vary the dynamic resistance of the field effect transistor 120.

Let us assume, for example, that a voltage of 6 volts is developed at the output terminal 114 when the static gap is 20 mils. A voltage proportional to 6 volts will, therefore, appear across potentiometer 126 and be applied to the gate of the field effect transistor 120. Now, let us assume that the static gap between the coil and the metallic object changes and that the gap output voltage at terminal 114 decreases to approximately 5.5 volts. Since the pickup coil 30 is now closer to the metallic object, the sensitivity of the apparatus will increase. However, the decrease in the voltage across potentiometer 126 will decrease the dynamic resistance of the field effect transistor 120 and the output amplitude of the signal appearing on the drain lead of the field effect transistor 120 will also decrease. In a similar manner, an increase in voltage will cause an increase in the dynamic resistance of the field effect transistor 120, thereby increasing the amplitude of the signal on the drain lead of field effect transistor 120.

The signal on the drain lead of field effect transistor 120 is applied through a capacitor 130 to the base of an emitter follower transistor stage 132. The transistor 132 has its emitter connected to ground through a potentiometer 134. The movable tap on potentiometer 134 is connected through a capacitor 136 to a pair of transistor amplifier stages 138 and 40. Finally, the output of amplifier stage 140 is applied to emitter follower stage 142 such that an output sinusoidal waveform corresponding to waveform B in FIG. 4 appears across an output impedance 144. The remaining elements of the stages 132, 138, 140 and 142 are conventional and need not be described in detail.

In the calibration of the circuitry of FIG. 3, a metallic object is usually spaced from the end of the pickup 68 by about 20 mils. Thereafter, the rheostat 94 in oscillator 70 is adjusted until the output voltage at terminal 144 assumes 6 volts. Thereafter, the pickup 68 is moved to a distance of 10 mils (average) from a vibrating object of known displacement. For example, the known displacement may be 1 mil. The potentiometer 134 on emitter follower stage 132 is then adjusted such that the output sinusoidal vibration signal has an amplitude of 240 millivolts RMS. Following this procedure, the pickup 68 is moved to a distance of 30 mils from a vibrating object of known displacement, and the object again is caused to vibrate with a peak-to-peak displacement of 1 mil. The potentiometer 126 connected to the gate of field effect transistor 120 is now adjusted such that the output sinusoidal vibration signal again has an amplitude of 240 millivolts RMS. This procedure is repeated such that the output amplitude between a static gap of 10–30 mils will be 240 millivolts RMS per displacement of 1 mil peak-to-peak.

Reverting again to FIG. 2, the pickup coil 30 is a small coil of copper wire. The electrical resistance of this copper wire has a positive temperature coefficient. In this respect, its resistance at 350°F is about 67 percent higher than at 75°F. The quality factor, Q, of the coil is inversely proportional to its resistance and, therefore, decreases at elevated temperatures. This, of course, causes a corresponding decrease in the sensitivity of the oscillator 70 and affects the output amplitude of the signal across resistor 144. This variation in resistance of the coil 30 is complicated by the fact that the surrounding tubular member 22, which acts to shield the coil 30 from surrounding metal bodies, is inductively coupled to the coil, forming an autotransformer of which the tubular member 22 is a shorted turn. As the temperature of the member 22 varies, so also will the coupling effect with the coil 30, causing variations in amplitude at the output of the oscillator. The thermistor 48 is, therefore, inserted in series with the coil 30; and since the thermistor has a negative temperature coefficient of resistance, it compensates for the change in resistance of the coil 30 resulting from temperature changes. The thermistor, however, has an exponential characteristic. That is, its resistance does not change linearly with temperature. This characteristic, however, can be made linear by placing the resistor 54 in parallel with the thermistor. The resistance of the thermistor can be expressed as:

$$R = Ae^{B/T}$$

wherein $R$ = resistance of thermistor, $e$ = base of natural logarithm, $A$ = constant for thermistor 48, $B$ = constant for thermistor 48, and $T$ = absolute temperature.

Therefore, in accordance with Ohm's law, the total resistance, $R_T$, of elements 48, 54 can be expressed:

$$R_T=(R_{54}\times R_{48})/(R_{54}+R_{48})=(R_{54}\times Ae^{B/T})/(R_{54}+Ae^{B/T})$$

wherein $R_{54}$ = resistance of resistor 54, and $R_{48}$ = resistance of thermistor 48. By selecting a thermistor 48 having suitable constants A and B (which are characteristics of the thermistor) and by selecting a suitable resistor 54, the total resistance $R_T$ can be made inversely linear as desired.

The operation of the thermistor 90 is somewhat similar. The resistor 98 in parallel with thermistor 90 causes the total resistance of the two elements to vary linearly rather than exponentially. As the temperature rises and the resistance of thermistor 90 decreases, the negative drive voltage on the base of PNP transistor 72 also decreases. This compensates for a decrease in the internal impedance of the transistor 72 which results from increased temperature.

The present invention thus provides a means for compensating for changes in both the resistance of the pickup coil 30 as well as changes in the sensitivity of the oscillator itself due to temperature changes. Although the invention has been shown in connection with a certain specific embodiment, it will be readily apparent to those skilled in the art that various changes in form and arrangement of parts may be made to suit requirements without departing from the spirit and scope of the invention. In this respect, for example, the compensating thermistor 90 in the oscillator circuit itself could be included in the emitter feedback network for transistor 72 or in its supply voltage lead, so long as the thermistor compensates for a change in output amplitude resulting from temperature changes.

We claim as our invention:

1. In vibration pickup apparatus, the combination of an electrical oscillator including a tuned circuit having at least one inductive and capacitive element therein, said inductive element being in the form of a coil of wire at one end of a probe adapted to be placed in close proximity to a body whose vibrations are to be sensed whereby the amplitude of the oscillations produced by said oscillator will be a function of the spacing between said coil and said body in the field of said coil, a metallic tubular element surrounding said coil and forming with said coil an autotransformer arrangement, said coil of wire having a positive temperature coefficient of resistance, and a thermistor having a negative temperature coefficient of resistance connected in series with said coil in the tuned circuit, said thermistor being carried within said probe closely adjacent said coil whereby the coil, the surrounding tubular element and the thermistor will be subjected to the same temperature and the total impedance of the coil and thermistor as presented to the oscillator will be substantially temperature invariant.

2. The electrical sensing apparatus of claim 1 including at least one resistor connected in parallel with said thermistor whereby the combined resistance of the parallel combination will vary linearly with temperature.

3. The electrical sensing apparatus of claim 1 wherein the series combination of said coil and thermistor is connected in parallel with a second inductor in said tuned circuit.

4. The combination of claim 1 wherein said coil of wire is wound around a bobbin of insulating material disposed adjacent to one end of said metallic tubular element, the thermistor being carried within a bore in the bobbin.

5. The combination of claim 1 wherein said oscillator includes a transistor having said tuned circuit connected between its emitter and collector, and a second thermistor included in the base bias network for said transistor.

6. The combination of claim 5 wherein said second thermistor also has a negative temperature coefficient of resistance.

7. The combination of claim 5 wherein said base bias network comprises a plurality of impedance elements connected in series between the opposite terminals of a source of driving potential for said oscillator, one of said impedance elements comprising said second thermistor, and a connection between the junction of two of said series-connected impedance elements and the base of said transistor.

8. In vibration pickup apparatus, the combination of an electrical oscillator including a tuned circuit having at least one inductive and capacitive element therein, said inductive element being in the form of a coil of wire at one end of a probe adapted to be placed in close proximity to a body whose vibrations are to be sensed whereby the amplitude of the oscillations produced by said oscillator will be a function of the spacing between said coil and said body in the field of said coil, said coil of wire having a positive temperature coefficient of resistance, a thermistor having a negative temperature coefficient of resistance connected in series with said coil in the tuned circuit, the series combination of said coil and thermistor being connected in parallel with a second inductor in said tuned circuit, at least one resistor connected in parallel with said thermistor whereby the combined resistance of the parallel combination will vary linearly with temperature, said probe being generally tubular in configuration and said coil of wire being wound around a bobbin of insulating material disposed adjacent one end of said tubular probe, the thermistor being carried within a bore in the bobbin, said oscillator including a transistor having said tuned circuit connected between its emitter and collector, a base bias network for said transistor, said base bias network comprising a plurality of impedance elements connected in series between opposite terminals of a source of driving potential for said oscillator, one of said impedance elements comprising a second thermistor having a negative temperature coefficient of resistance, and a connection between the junction of two of said series-connected impedance elements and the base of said transistor.

* * * * *